No. 683,703. Patented Oct. 1, 1901.
W. F. C. NINDEMANN.
INDICATOR AND RECORDER FOR THE PITCH OR ROLL OF VESSELS.
(Application filed Mar. 14, 1901.)
(No Model.) 2 Sheets—Sheet 1.
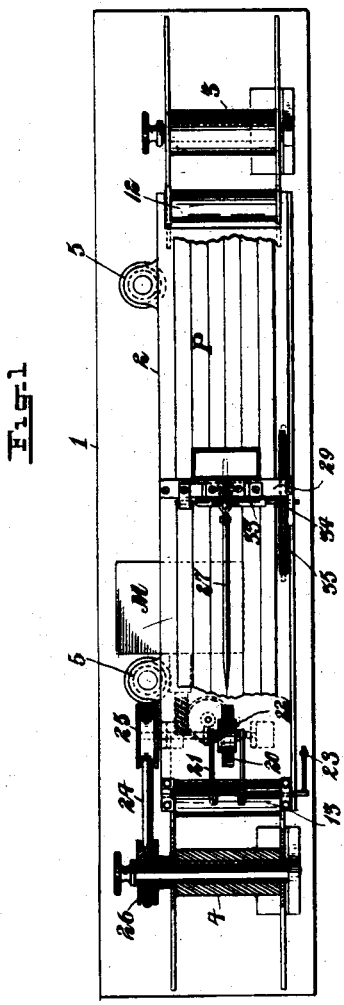
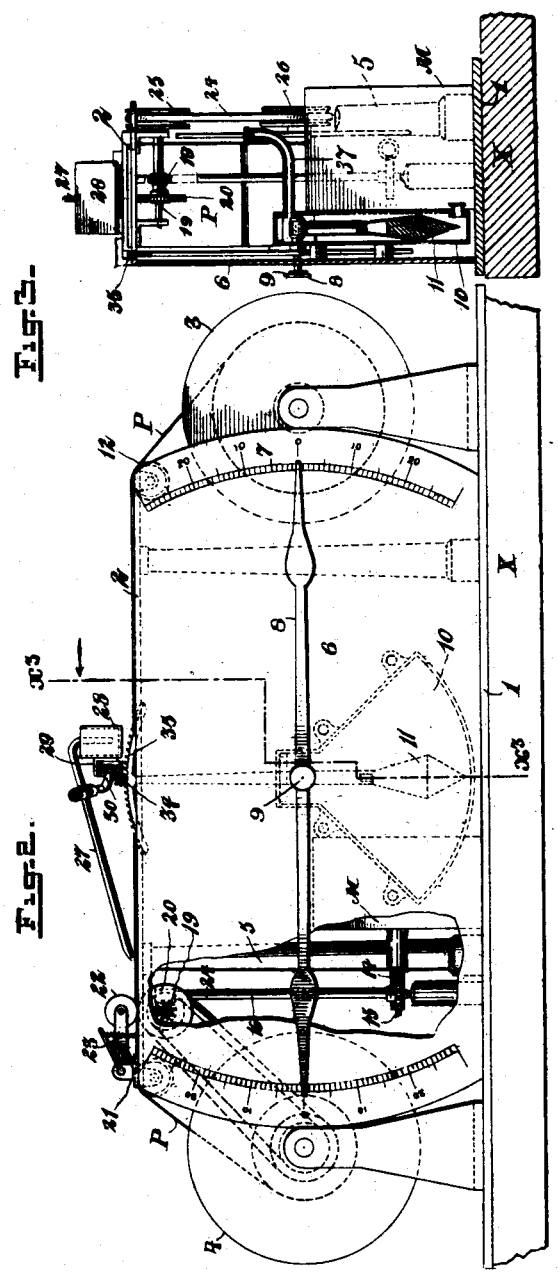
WITNESSES:
INVENTOR
William F. C. Nindemann
BY
Attorney No. 683,703. Patented Oct. 1, 1901.
W. F. C. NINDEMANN.
INDICATOR AND RECORDER FOR THE PITCH OR ROLL OF VESSELS.
(Application filed Mar. 14, 1901.)
(No Model.) 2 Sheets—Sheet 2.
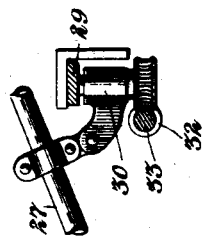
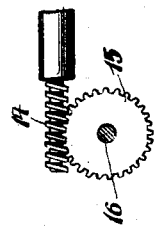
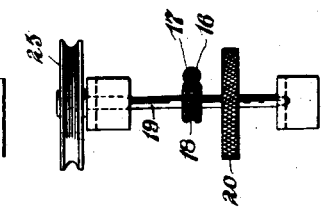
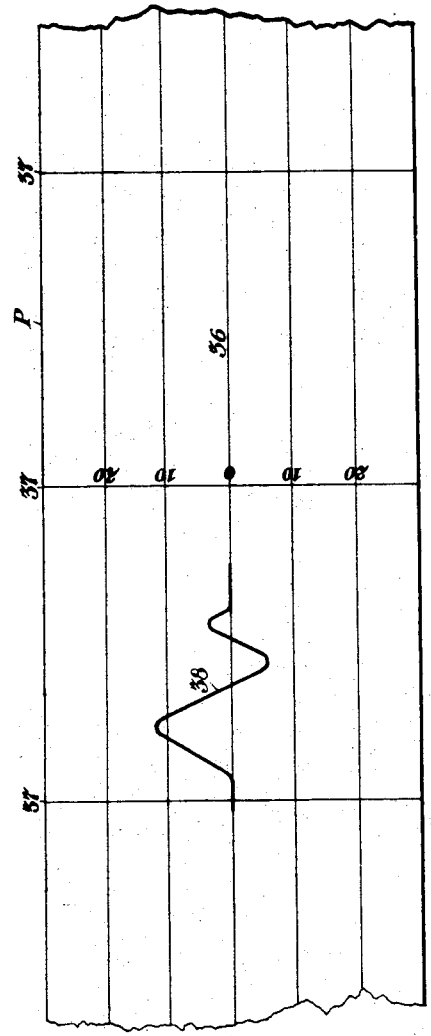
WITNESSES:
INVENTOR
William F. C. Nindemann
BY
ATTORNEY

UNITED STATES PATENT OFFICE.

WILLIAM F. C. NINDEMANN, OF NEW YORK, N. Y.

INDICATOR AND RECORDER FOR THE PITCH OR ROLL OF VESSELS.

SPECIFICATION forming part of Letters Patent No. 683,703, dated October 1, 1901.

Application filed March 14, 1901. Serial No. 51,193. (No model.)

*To all whom it may concern:*

Be it known that I, WILLIAM F. C. NINDEMANN, a citizen of the United States, residing in the city of New York, borough of Brooklyn, in the county of Kings and State of New York, have invented certain new and useful Improvements in Indicators and Recorders for the Pitch or Roll of Vessels, of which the following is a specification.

This invention relates to a combined indicator and recorder—that is, to an instrument which will indicate visually at any moment the pitch or roll of a vessel in degrees of inclination with respect to a horizontal plane and one which will at the same time make a permanent record of the extent of such inclination at all hours of the day and night during a voyage.

In the drawings which serve to illustrate an embodiment of the invention, Figure 1 is a plan of the instrument. Fig. 2 is a side elevation of the same. Fig. 3 is a vertical section at $x^3$ in Fig. 2. Figs. 4, 5, and 6 are enlarged detail views of the recording mechanism. Fig. 7 is a view showing a part of the record-strip enlarged.

The instrument, as herein shown, is supposed to be mounted in the axis of a vessel in a horizontal position to indicate and record the pitch—as, for example, on a shelf X, forming a part of the vessel.

1 is the base of the instrument, and 2 the bed or table thereof, over which the strip of paper P of the recorder passes on its way from the delivery-roller 3 to the take-up roller 4. In Fig. 2 these rollers or drums are represented as having paper wound on them, but in Fig. 1 they are shown as empty and the take-up roller in section. A part of the strip P is, however, shown on the table in Fig. 1. The table 2 is supported on suitable posts 5, and at the front is an upright dial-plate 6, having degree-graduations 7 at its ends. These graduations are traversed by a double-ended needle or hand 8, secured to an arbor 9, rotatively mounted in the dial-plate and in the walls of a liquid-receptacle 10, secured to the rear or inner face of said dial-plate. On the arbor 9 is fixed a pendulum 11, which is suspended in the liquid in said receptacle. The adjustment is such that when the vessel is on an even keel, with the needle extending fore and aft amidships, the pendulum will hold the needle at the zero-marks of the graduations 7. Any pitching of the vessel will be at once indicated visually by the needle or hand 8, and the degree of the pitch will be indicated on the graduated limbs. The liquid in the receptacle 10 prevents rapid vibrations of the pendulum and needle, but permits sufficiently free movement of the pendulum in the receptacle.

To record the extent of the pitching of the vessel and the time of the occurrence, the strip P, before mentioned, is employed. This strip from the roller 3 extends up over an end roller 12 on the table, then over the table to the other end, and thence over a roller 13 at that end and down to the take-up roller 4. This strip P is driven or drawn over the table from right to left at a uniform and known rate of speed by some prime mover. As here shown this is an electric motor M, indicated only diagrammatically in the drawings. This motor, through a worm 14 on its arbor and a worm-wheel 15, Fig. 5, drives an upright shaft 16, and a worm 17 on this shaft gears with a worm-wheel 18 on a cross-shaft 19, Fig. 4, and drives the latter. On the shaft 19 is secured a feed-wheel 20, the periphery of which projects up through a slot in the table under the strip of paper, and mounted in a swing-frame 21 above the table and strip is a pressure-roller 22, which presses the strip down upon the feed-wheel elastically, the pressure being applied by a suitable spring 23. The feed-wheel feeds the paper P along slowly and uniformly, and the strip is rolled up on the roller 4, through the medium of a slip-belt 24, over a sheave 25 on the cross-shaft 19 and a similar wheel 26 on the prolonged journal of the said roller 4. The record is made on the moving strip P by means of a siphon pen or marker 27, the point of which rests on the strip and the receiving end of which is immersed in ink in an ink-holder 28, mounted on a bridge-frame 29 on the table above and over the strip P. The pen 27 is carried by an arm 30, pivotally mounted on an upright axis in said bridge-frame. On the spindle or axis of said arm is secured a worm wheel or segment 31, which gears with a worm 32 on an arbor 33, mounted transversely in said bridge-frame, and to this arbor is secured a pinion 34, which gears with a curved rack 35, carried by the needle-arbor 9. Thus any movement of the needle or hand 8 over the graduations on the dial is recorded on the moving strip of paper P by the lateral movement of the point of the pen 27 from the center or zero line on the paper, the extent of the movement of the pen varying with the degree of inclination of the pitch of the vessel.

Fig. 7 shows the preferred mode of marking the strip P—that is, it will have lines ruled longitudinally to indicate degrees, the median line 36 being zero and the lines at either side of this median line being suitably spaced to indicate degrees, as five degrees, ten degrees, fifteen degrees, &c. The transverse lines 37 will designate time-divisions, as minutes, &c. The heavy line 38 is that made by the recording-pen. When the vessel is not pitching, but running on an even keel, the pen 27 will follow the median line 36; but if the vessel is inclined in pitching the marking-point of the needle will shift to one side or the other of the line 36. By placing the instrument transversely of the vessel it will indicate and record the roll of the latter.

It will be understood without explanation that the pendulum is supposed to remain stationary and the body of the instrument to turn about the axis of the arbor 9. This arbor, the needle 8, and the rack 35 are also supposed to be and remain stationary.

The electric motor M will be of course timed to move the strip P at an exact rate of speed; but a clock mechanism may be employed in lieu of or in connection with said motor for timing the movement of the strip.

Having thus described my invention, I claim—

1. In an instrument for indicating and recording the pitch or roll of vessels, the combination with a rotatively-mounted arbor, a pendulum secured to said arbor and pendent therefrom, in a liquid-receptacle, the said receptacle, a table fixed with respect to said arbor, means for moving a strip of paper over said table at a uniform rate of speed, a movable pen or marker adapted to be moved to and fro over said moving paper, and to make a record-mark thereon, and mechanism between said arbor and pen whereby the pendulum controls the movements of said pen.

2. In an instrument for the purpose specified, the combination of a dial-plate, an arbor therein, a needle or hand secured to said arbor and adapted to traverse the dial-graduations, a pendulum secured to said arbor and pendent in a liquid-receptacle, a table fixed with respect to said dial-plate, means for moving a strip of paper over said table at a uniform rate of speed, a movable pen or marker supported on said table and adapted to be moved to and fro transversely of said strip, and to make a record-mark thereon, a curved rack carried by the arbor which carries the pendulum, and mechanism between said rack and the pen for operating the latter, substantially as set forth.

In witness whereof I have hereunto signed my name, this 4th day of March, 1901, in the presence of two subscribing witnesses.

WILLIAM F. C. NINDEMANN.

Witnesses:
HENRY CONNETT,
PETER A. ROSS.